(12) United States Patent
Gustavsson et al.

(10) Patent No.: US 11,812,393 B2
(45) Date of Patent: Nov. 7, 2023

(54) TRANSMISSION POWER ALLOCATION

(71) Applicant: Telefonaktiebolaget LM Ericsson (publ), Stockholm (SE)

(72) Inventors: Ulf Gustavsson, Gothenburg (SE); Christopher Mollén, Norrköping (SE); Erik Larsson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 282 days.

(21) Appl. No.: 17/294,782

(22) PCT Filed: Nov. 20, 2018

(86) PCT No.: PCT/EP2018/081867
§ 371 (c)(1),
(2) Date: May 18, 2021

(87) PCT Pub. No.: WO2020/104014
PCT Pub. Date: May 28, 2020

(65) Prior Publication Data
US 2022/0015041 A1    Jan. 13, 2022

(51) Int. Cl.
*H04W 52/24*    (2009.01)
*H04W 52/42*    (2009.01)

(52) U.S. Cl.
CPC ....... *H04W 52/243* (2013.01); *H04W 52/242* (2013.01); *H04W 52/42* (2013.01)

(58) Field of Classification Search
CPC . H04W 52/243; H04W 52/242; H04W 52/42; H04W 52/246
See application file for complete search history.

(56) References Cited

U.S. PATENT DOCUMENTS 8,891,657 B2 * 11/2014 Medbo ............... H04W 52/247
                                                         375/267
2018/0234867 A1 * 8/2018 Wang ............... H04W 72/0473

OTHER PUBLICATIONS

Mollen Christopher et al.: "Spatial Characteristics of Distortion Radiated from Antenna Arrays with Transceiver Nonlinearities", IEEE Transactions on Wireless Communications, vol. 17, No. 10, Oct. 1, 2018 (Oct. 1, 2018), pp. 6663-6679, XP011691260, issn: 1536-1276, DOI: 10.1109/TWC.2018.2861872. (Year: 2018).*

(Continued)

*Primary Examiner* — John J Lee
(74) *Attorney, Agent, or Firm* — Christopher & Weisberg, P.A.

(57) ABSTRACT

A transmission power allocation method for a transmitter is disclosed. The transmitter includes a number of at least two transmitter paths for spatial multiplexing of two or more signals to be transmitted using respective allocated transmission powers to respective ones of two or more users, wherein each transmitter path includes at least one component causing non-linear distortion and a transmit antenna. The method includes determining a respective received distortion power for each of the two or more users as a function of respective hypothesized transmission powers for the two or more users and based on a model of a spatial behavior of the non-linear distortion. The method also includes allocating respective transmission powers for the two or more users based on the determined respective received distortion powers. Corresponding transmission power allocation apparatus, transmitter, network node, wireless communication device are also disclosed.

18 Claims, 3 Drawing Sheets

(56) References Cited

OTHER PUBLICATIONS

EPO Communication dated Feb. 25, 2022 for Patent Application No. 18807066.8, consisting of 6-pages.
International Search Report and Written Opinion dated Jul. 3, 2019 for International Application No. PCT/EP2018/081867 filed Nov. 20, 2018, consisting of 10-pages.
Hei Victor Cheng et al.; Optimal Pilot and Payload Power Control in Single-Cell Massive MIMO Systems; IEEE Transactions on Signal Processing; vol. 65, No. 9, May 1, 2017, consisting of 16-pages.
Christopher Mollén et al.; Impact of Spatial Filtering on Distortion from Low-Noise Amplifiers in Massive MIMO Base Stations; IEEE Transactions on Communications; vol. 66, Issue 12, Dec. 2018, consisting of 17-pages.
Christopher Mollén et al.; Spatial Characteristics of Distortion Radiated From Antenna Arrays With Transceiver Nonlinearities; IEEE Transactions on Wireless Communications; vol. 17, No. 10, Oct. 2018, consisting of 17-pages.
Thomas L. Marzetta et al.; Fundamentals of Massive MIMO; Cambridge University Press, 2016, consisting of 17-pages.

\* cited by examiner

TRANSMISSION POWER ALLOCATION

CROSS-REFERENCE TO RELATED APPLICATION

This application is a Submission Under 35 U.S.C. § 371 for U.S. National Stage Patent Application of International Application Number: PCT/EP2018/081867, filed Nov. 20, 2018 entitled "TRANSMISSION POWER ALLOCATION," the entirety of which is incorporated herein by reference.

TECHNICAL FIELD

The present disclosure relates generally to the field of wireless communication. More particularly, it relates to transmission power allocation for transmission to two or more users.

BACKGROUND

In advanced antenna systems (AAS), such as, e.g., massive multi-user multiple-input multiple output (MU-MIMO) systems, spatial multiplexing is used to improve the overall throughput. The spatial multiplexing is typically achieved by application of a suitable precoder that spatially directs transmission signals intended for different users towards the respective locations of the users. In some scenarios, the users in such systems may thereby enjoy the simultaneous use of all time-frequency resources.

To achieve the desired (or expected) data rates and/or quality of service in such systems, it is typically important to properly allocate respective transmit powers to be used for transmissions to the respective users. Such allocation may typically be based on path loss and channel quality.

For some different precoders, power allocation schemes have been developed which aim to maximize the minimum rate or maximize the sum rate; see, for example, Marzetta, Larsson, Yang and Ngo, "Fundamentals of Massive MIMO", Cambridge University Press, 2016, chapter 5, and Cheng, Bjornson, and Larsson, "Optimal pilot and payload power control in single-cell massive MIMO systems", IEEE Transactions on Signal Processing, 65(9), 2017, pp. 2363-2378.

However, presence of non-linear components in the transmitter may have detrimental effect on the data rates when such power allocation schemes are applied.

Therefore, there is a need for alternative power allocation schemes for multi-user transmission that enable mitigation of distortion caused by non-linear components in the transmitter.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a transmission power allocation method for a transmitter. The transmitter comprises a number of at least two transmitter paths for spatial multiplexing of two or more signals to be transmitted using respective allocated transmission powers to respective ones of two or more users, wherein each transmitter path comprises at least one component causing non-linear distortion and a transmit antenna.

The method comprises determining a respective received distortion power for each of the two or more users as a function of respective hypothesized transmission powers for the two or more users and based on a model of a spatial behavior of the non-linear distortion, and allocating respective transmission powers for the two or more users based on the determined respective received distortion powers.

In some embodiments, determining the respective received distortion power comprises determining a distortion coefficient based on the model of the spatial behavior of the non-linear distortion, and determining the respective received distortion power based on the distortion coefficient.

In some embodiments, the method further comprises measuring a received distortion component caused by the non-linear distortion. Then, determining the distortion coefficient is further based on the measured received distortion component.

In some embodiments, allocating respective transmission powers comprises determining, for each of the two or more users, a ratio between an estimated received desired signal power and an estimated received disturbance power, wherein the estimated received disturbance power comprises the respective received distortion power, and allocating respective transmission powers based on the ratios.

In some embodiments, the method further comprises acquiring, for each user, an estimated path loss and a channel quality metric. Then, the estimated received desired signal power and/or the estimated received disturbance power is based on the estimated path loss and the channel quality metric.

In some embodiments, allocating respective transmission powers comprises mapping, for each of the two or more users, the ratio to a corresponding achievable data rate, and allocating respective transmission powers based on the achievable data rates.

In some embodiments, allocating respective transmission powers based on the achievable data rates comprises one of: allocating respective transmission powers that maximizes a minimum data rate among the users, and allocating respective transmission powers that maximizes a sum of data rates among the users.

In some embodiments, the respective received distortion power is further based on the number of transmitter paths.

In some embodiments, the model of the spatial behavior of the non-linear distortion is a polynomial model.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a transmission power allocation apparatus for a transmitter. The transmitter comprises a number of at least two transmitter paths for spatial multiplexing of two or more signals to be transmitted using respective allocated transmission powers to respective ones of two or more users, wherein each transmitter path comprises at least one component causing non-linear distortion and a transmit antenna.

The arrangement comprising controlling circuitry configured to cause determination of a respective received distortion power for each of the two or more users as a function of respective hypothesized transmission powers for the two or more users and based on a model of a spatial behavior of the non-linear distortion, and allocation of respective transmission powers for the two or more users based on the determined respective received distortion powers.

In some embodiments, the apparatus further comprises power-allocating circuitry configured to allocate the respective transmission powers for the two or more users based on the determined respective received distortion powers.

A fourth aspect is a transmitter comprising the apparatus according to the third aspect and the at least two transmitter paths.

A fifth aspect is a network node or a wireless communication device comprising one or more of the apparatus according to the third aspect and the transmitter according to the fourth aspect.

In some embodiments, any of the above aspects may additionally have features identical with or corresponding to any of the various features as explained above for any of the other aspects.

An advantage of some embodiments is that alternative power allocation schemes for multi-user transmission are provided, that enable mitigation of distortion caused by non-linear components in the transmitter.

Another advantage of some embodiments is that a power allocation algorithm is provided, that offers improved data rates (e.g., sum-rate, min-rate, etc.). This is achieved according to some embodiments by adjusting the power allocation between users based on knowledge of the covariance of the distortion caused by non-linear components.

Yet an advantage of some embodiments is that the number of instances where retransmission and/or rescheduling is needed may be decreased.

Yet another advantage of some embodiments is that there is no need to use digital pre-distortion to mitigate distortion caused by non-linear components in the transmitter. This in turn has the advantage of substantially relaxing oversampling requirements.

For some embodiments, one or more benefit may be especially prominent for mmW frequency bands. There, the linearity specification is typically rather loose and the pre-distortion possibilities are highly limited.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, conventional power allocation schemes do not consider the non-linear effects of the power amplifier, nor the distortion caused by the non-linearity. While MU interference may be handled using spatial multiplexing (e.g., linear MIMO precoding), distortion stemming from non-linearity (e.g., due to non-linear power amplifiers) is not mitigated and may further cause leakage of MU interference; see, for example, C. Mollén, U. Gustavsson, T. Eriksson, and E. G. Larsson, "Spatial characteristics of distortion radiated from antenna arrays with transceiver nonlinearities", in IEEE Transactions on Wireless Communications, vol. 17, no. 10, pp. 6663-6679, October 2018, and C. Mollén, U. Gustavsson, T. Eriksson, and E. G. Larsson, "Impact of Spatial Filtering on Distortion from Low-Noise Amplifiers in Massive MIMO Base Stations", in IEEE Transactions on Communications, December 2017.

One drawback of not attending to the non-linearity distortion is that users, which are allocated a small portion of the transmit power when a signal-to-interference-plus-noise ratio (SINR) is used as metric for power allocation, may very well suffer from relatively low signal-to-interference-plus-noise-plus-distortion ratio (SINDR). Thereby, they would in fact benefit from being allocated a higher portion of the transmit power than a determination based on SINR indicates.

This type of problem may become particularly prominent in situations where there is a large diversity among the powers allocated to the different users. In some scenarios, users that are allocated the least amount of power (based on, e.g., SINR considerations) may drown in distortion caused by non-linearity, and may thereby suffer by a very limited data rates. For example, a user which is close to the transmitter may be subject to excessive disturbance caused by non-linear distortion transmitted in its direction. This may be especially prominent if said user is co-scheduled with a cell-edge user requiring a large portion of the transmit power.

The non-linearity distortion is typically compensated for via complex digital pre-distortion approaches. Such mitigation may be very cumbersome, or even impossible with current technology, to implement in some scenarios. Such scenarios include systems with many transmit antennas (e.g., massive MIMO) and/or systems operating in relatively high frequency ranges (e.g., millimeter wavelength—mmW). For example, the required oversampling rate and/or the required bandwidth for digital pre-distortion may reach levels that are cumbersome to accommodate.

In the following, embodiments will be described where transmit power allocation is provided with mitigation of distortion caused by the non-linearity.

Even though the embodiments disclosed herein are focused on implementations in a network node, it should be noted that this is by no means intended as limiting. Contrarily, embodiments may, for example, be equally applicable in a wireless communication device transmitting to two or more other wireless communication device or, more generally, in any wireless communication apparatus transmitting to two or more other wireless communication apparatuses (users in the terminology of the claims).

Figure 1:
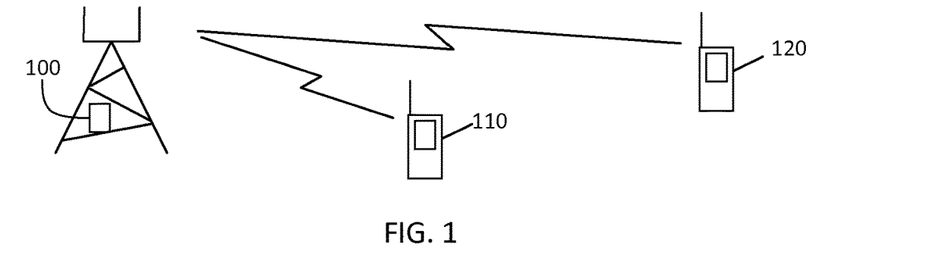
FIG. 1 is a schematic drawing illustrating an example transmission scenario according to some embodiments.

FIG. 1 schematically illustrates an example transmission scenario where a network node 100 transmits to two users 110, 120 using spatial multiplexing in the presence of distortion caused by non-linear components in the transmitter of the network node 100.

Figure 2:
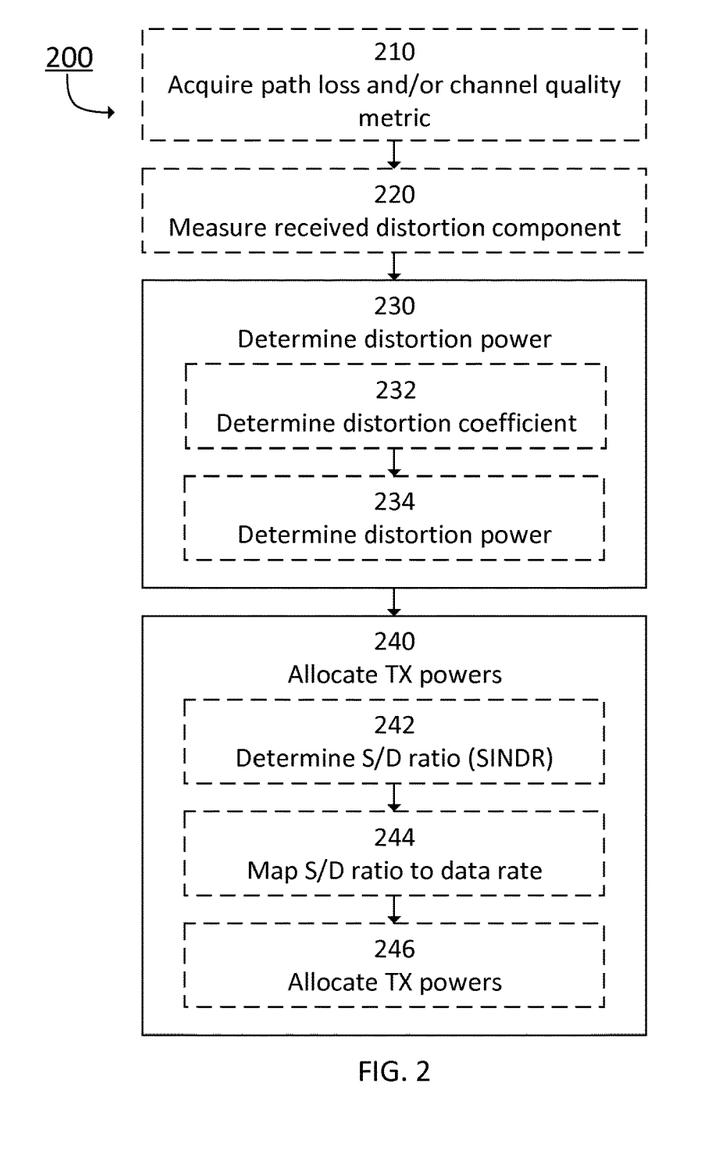
FIG. 2 is a flowchart illustrating example method steps according to some embodiments.

FIG. 2 illustrates an example method 200 according to some embodiments. The method 200 is for transmission power allocation in a transmitter and may, for example, be applied by the network node 100 of FIG. 1. The method may be particularly useful for transmitters with many transmit antennas (e.g., massive MIMO) and/or for transmitters operating in relatively high frequency ranges (e.g., millimeter wavelength—mmW). Generally, the method may be applied in combination with digital pre-distortion or without digital pre-distortion.

A transmitter, in relation to which the method 200 may be suitable, comprises a number of at least two transmitter paths for spatial multiplexing (e.g., beam-forming transmission, MU-MIMO, etc.) of two or more signals to be transmitted using respective allocated transmission powers to respective ones of two or more users, wherein each transmitter path comprises at least one component causing non-linear distortion and a transmit antenna. Typically, a user may be defined as a wireless communication device (e.g., a user equipment—UE, a station—STA, a mobile terminal, etc.). Examples of components that may cause non-linear distortion include power amplifiers (PAs) and low-resolution data converters.

In optional step 210, an estimated path loss $\beta_k$ (wherein $\beta_k=1$ denotes a loss-less channel) and/or a channel quality metric $0<c_k\leq 1$ is acquired for each user k. The channel quality metric is a measure of the quality of the channel knowledge, wherein $c_k=1$ denotes perfect (full) channel knowledge and $c_k=0$ means no channel knowledge at all. In practical cases, $c_k$ may typically depend on the signal-to-noise ratio (SNR) for pilot reception and/or for channel estimation.

The acquisition may be accomplished by reception of a signal form one or more of the users, wherein the signal is indicative of the estimated path loss (e.g., estimated by the user) and/or of the channel quality metric (e.g., determined by the user). Alternatively or additionally, the acquisition may be accomplished by estimating the path loss and/or determining the channel quality metric.

In optional step 220, a received distortion component caused by the non-linear distortion is measured. Typically, the received distortion component is the same for all of the users. For example, the received distortion component may be denoted as $f(x)$, where x represents the input signal to a transmitter path (or a non-linear component) and $f(\cdot)$ is a representation of the effect the transmitter path (or the non-linear component) has on the input signal. Measurements of the received distortion component may be performed by any suitable approach, for example, by application of a known input signal x.

In step 230, a respective received distortion power is determined for each user as a function of respective hypothesized transmission powers $P_k$ for the users. The received distortion power may be determined based on spatial correlation of the distortion caused by non-linearity between the users. The spatial properties of the distortion typically depend on the second order statistics of the transmitted distortion. For example, the received distortion power may be determined as the spatial covariance of the distortion caused by non-linearity.

The determination of the received distortion power is based on a model of a spatial behavior of the non-linear distortion. The model may be configured to mimic the effect $f(\cdot)$ that the transmitter path (or the non-linear component) has on the input signal. The model may be a polynomial model, for example, based on Itô-Hermite polynomials as described in Mollén, Gustaysson, Eriksson, and Larsson, "Spatial characteristics of distortion radiated from antenna arrays with transceiver nonlinearities". Other polynomial models are also possible as representations of the spatial behavior of the non-linear distortion. In typical embodiments, the third (and/or fifth, and/or seventh, and/or other) order term of the polynomial model is used as an approximation of the model.

The determination of the respective received distortion powers may be further based on the number M of transmitter paths.

In some embodiments, determining the respective received distortion power comprises determining a distortion coefficient based on the model of the spatial behavior of the non-linear distortion as illustrated by optional sub-step 232, and determining the respective received distortion power based on the distortion coefficient as illustrated by optional sub-step 234. Typically, the distortion coefficient is the same for all of the users. The distortion coefficient may be further based on the received distortion component measured in optional step 220 according to some embodiments.

In a particular example of an implementation of step 230, the effect of non-linear power amplifiers are modeled using Itô-Hermite polynomials, and a distortion coefficient $D \propto |\alpha_3|^2$ is computed (compare with sub-step 232), in which $$a_3 = \frac{E[f(x)H_3^*(x)]}{E[|H_3(x)|^2]}$$

where $E[\cdot]$ represents expected value, * represents complex conjugate, $f(\cdot)$ represents the power amplifier non-linearity, $H_3(x)$ is the third degree Itô-Hermite polynomial and x is the input signal. Thus, the distortion coefficient D is based on the model $H_3(x)$ of the spatial behavior and on the received distortion component $f(x)$ (compare with step 220).

The proportionality coefficient of the relation $D \propto |\alpha_3|^2$ typically depends on the waveform that is used for a pulse-shape filter and a matched receive filter; see Mollén, Gustaysson, Eriksson, and Larsson, "Impact of Spatial Filtering on Distortion from Low-Noise Amplifiers in Massive MIMO Base Stations". The proportionality coefficient may be close to one in many cases.

Some example approaches for determining SINR are described in Mollén, Gustaysson, Eriksson, and Larsson, "Spatial characteristics of distortion radiated from antenna arrays with transceiver nonlinearities", and Mollén, Gustaysson, Eriksson, and Larsson, "Impact of Spatial Filtering on Distortion from Low-Noise Amplifiers in Massive MIMO Base Stations. These approaches are used according to some embodiments, with modifications to accommodate non-linearity distortion.

Continuing the particular example of an implementation of step 230 and considering the case of two users, the distortion power may be determined via the expression:

$$R_{e_k,e_k}[l] = |a_3|^2(\gamma_{3,-1}[l]P_1^2P_2 g(\varphi_1-\varphi_2) + \gamma_{3,0}[l](P_1^3 + 2P_1P_2^2)M^2 + \gamma_{3,1}[l](2P_1^2P_2+P_2^3)g(\varphi_2-\varphi_1))$$

where $R_{e_k,e_k}[l]$ denotes the autocorrelation (or covariance) for the received distortion $e_k$ of user k (in the above formula, it may be assumed, e.g., that k=1), $P_k$ denotes the hypothesized transmission power for user k, $\gamma_{i,j}[l]$ is a constant that is determined by the pulse-shape filter ($\gamma_{i,j}[l]$ may denote a relation between the filter coefficients at time instances—or filter taps—i and j), M is the number of transmitter paths, $g(\cdot)$ is a function describing the radiation pattern from the array wherein $g(0)=M^2$ is the power gain in the direction of transmission, $\varphi_k$ is a spatial direction associated with user k, and l is the autocorrelation time lag.

The terms for $g(\varphi_1-\varphi_2)$ and $g(\varphi_2-\varphi_1)$ can be neglected since they are very small compared to the term for $g(0)$. Thus, the distortion power (e.g., experienced by user k=1) may be approximated as $|a_3|^2(\gamma_{3,0}[l](P_1^3+2P_1P_2^2)M^2)$ in this example (compare with sub-step 234).

Thus, the respective received distortion power is determined based on spatial covariance of the distortion caused by non-linearity; based on the distortion coefficient $|a_3|^2$, the number M of transmitter paths, and as a function of respective hypothesized transmission powers $P_k$ for the users.

Other ways of determining respective received distortion power include numerically estimating the covariance.

In step 240, respective transmission (TX) powers are allocated for the users based on the determined respective received distortion powers of step 230.

In some embodiments, allocating respective transmission powers may comprise determining (for each of the two or more users) a ratio S/D between an estimated received desired signal power and an estimated received disturbance power as illustrated by optional sub-step 242, and allocating the respective transmission (TX) powers based on the ratios as illustrated by optional sub-step 246.

The estimated received disturbance power comprises the respective received distortion power. The estimated received disturbance power may also comprise noise and/or interference (e.g., multi-user interference and/or a channel estimation quality term). The ratio S/D may be a signal-to-interference-noise-and-distortion rate (SINDR), for example.

The estimated received desired signal power and/or the estimated received disturbance power may be based on the estimated path loss and/or the channel quality metric acquired in optional step 210 according to some embodiments. Alternatively or additionally, the estimated received desired signal power and/or the estimated received disturbance power may be based on the number M of transmitter paths and the respective hypothesized transmission powers $P_k$ for the users.

In some embodiments, the ratio S/D may be mapped (for each of the two or more users) to a corresponding achievable data rate as illustrated by optional sub-step 244, and the allocation in optional sub-step 246 may be based on the achievable data rates.

Examples principles that may be applied for the allocation include fair allocation, proportional fair allocation, prioritizing one or more of the users over other users, etc.

Furthermore, the allocation of optional sub-step 246 may be based on any suitable optimization approach, using any suitable metric (e.g., S/D, SINDR, achievable data rates, or any suitable quality of service metric) as an optimization parameter.

For example, allocating respective transmission powers based on the achievable data rates may comprise one of: allocating respective transmission powers that maximizes a minimum data rate among the users, and allocating respective transmission powers that maximizes a sum of data rates among the users.

In a particular example of an implementation of step 240 considering the case of two users, the following SINDR-expressions may be used as the S/D ratios of optional sub-step 242:

$$SINDR_1 = \frac{c_1\beta_1 P_1(M-2)}{N_0+\beta_1(1-c_1)P_t+c_1\beta_1 D(M-2)(2P_1P_2^2+P_1^3)}$$

$$SINDR_2 = \frac{c_2\beta_2 P_2(M-2)}{N_0+\beta_2(1-c_2)P_t+c_2\beta_2 D(M-2)(2P_2P_1^2+P_2^3)}$$

where $SINDR_k$ denotes the S/D ratio for user k, $P_k$ denotes the hypothesized transmission power for user k, M is the number of transmitter paths, $\beta_k$ is an estimated path loss for user k (e.g., acquired in optional step 210), $c_k$ is a channel quality metric for each user k (e.g., acquired in optional step 210), $N_0$ represents the power of thermal noise, D is the distortion coefficient from optional sub-step 232, and $P_t=P_1+P_2$ denotes the total available transmission power.

Thus, a ratio S/D ($SINDR_k$) is determined for user k between an estimated received desired signal power ($c_k\beta_k P_k(M-2)$) and an estimated received disturbance power ($N_0+\beta_k(1-c_k)P_t+c_k\beta_k D(M-2)(2P_kP_n^2+P_k^3)$), where n denotes the other user and where the estimated received disturbance power comprises the respective received distortion power ($c_k\beta_k D(M-2)(2P_kP_n^2+P_k^3)$), noise ($N_0$) and a channel estimation quality term ($\beta_k(1-c_k)P_t$). Both the estimated received desired signal power and the estimated received disturbance power are based on the estimated path loss $\beta_k$, the channel quality metric $c_k$, the number M of transmitter paths, and the respective hypothesized transmission powers $P_k$.

Compared to conventional SINR expressions, the above expressions include a new term associated with non-linear distortion (the last term in the denominator; the respective received distortion power).

Using the equations for $SINDR_k$ appropriate values of $P_k$ may be found (compare with optional sub-step 246), e.g., according to some suitable optimization approach as discussed above. Thus, power allocation coefficients may be selected which take the non-linear distortion into account. For example, the selection may aim at minimizing the distortion-based interference otherwise transmitted to users close to the transmitter (e.g., a network node).

The above expressions for $SINDR_k$ are provided based on the distortion power ($R_{e_k,e_k}[l]$) from the particular example of an implementation of step 230 under the assumptions that the number of antennas M is large so that the non-coherent part of the distortion at the receiver is negligible compared to the coherent part (which means that the first and third terms in the above expression for $R_{e_k,e_k}[l]$ may be neglected and $R_{e_k,e_k}[l] \approx |a_3|^2\gamma_{3,0}[l](P_1^3+2P_1P_2^2)M^2$), that the third-degree distortion is dominant, and that the array gain of the coherent part of the distortion is the same as the desired signal (when zero-forcing, ZF, is used and there are two users, the array gain is M−2).

Figure 3:
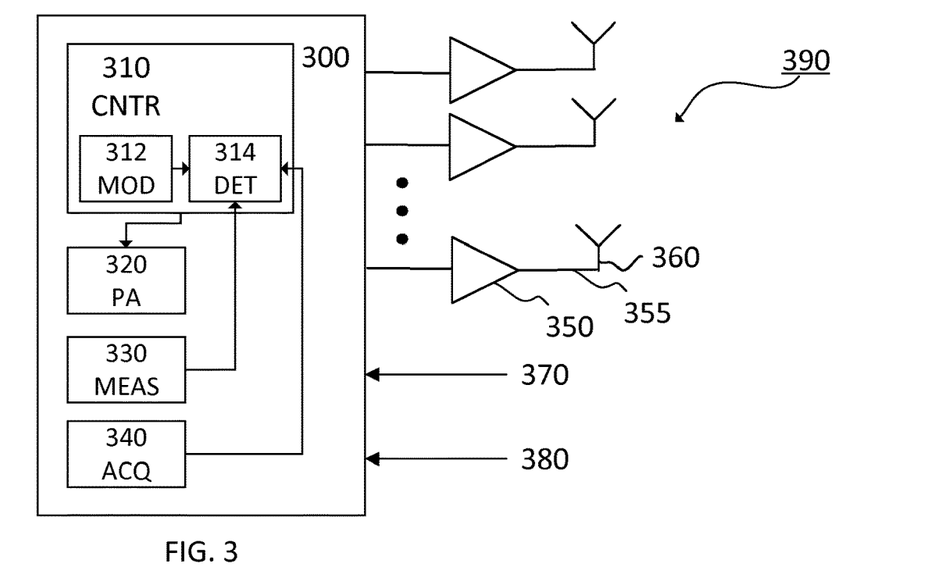
FIG. 3 is a schematic block diagram illustrating an example arrangement according to some embodiments.

FIG. 3 schematically illustrates an example arrangement 390 according to some embodiments. The arrangement 390 may, for example, be comprised in the network node 100 of FIG. 1.

The example arrangement is for a transmitter and comprises a transmission power allocation apparatus 300. The transmitter comprises a number of at least two transmitter paths 355 for spatial multiplexing of two or more signals to be transmitted using respective allocated transmission powers to respective ones of two or more users. Each transmitter path 355 comprises at least one component causing non-linear distortion (a power amplifier 350 in FIG. 3) and a transmit antenna (360).

The transmission power allocation apparatus 300 comprises controlling circuitry (CNTR; e.g., a controller) 310. The controlling circuitry may, for example, be configured to cause execution of one or more of the method steps described above in relation to FIG. 2.

The controlling circuitry is configured to cause determination of a respective received distortion power for each of the two or more users as a function of respective hypothesized transmission powers for the two or more users and based on a model of a spatial behavior of the non-linear distortion (compare with step 230 of FIG. 2). To this end, the controlling circuitry may comprise or be otherwise associated with (e.g., connectable, or connected, to) determining circuitry (DET; e.g., a determiner) 314. The determining circuitry may be configured to cause the determination of the respective received distortion power for each of the two or more users. For example, the determining circuitry may be configured to determine the respective received distortion power for each of the two or more users.

In some embodiments, the controlling circuitry may be configured to cause the determination of the respective received distortion power by causing determination of a distortion coefficient based on the model of the spatial behavior of the non-linear distortion, and determination of the respective received distortion power based on the distortion coefficient (compare with sub-steps 232 and 234 of FIG. 2). To this end, the controlling circuitry may comprise or be otherwise associated with (e.g., connectable, or connected, to) modelling circuitry (MOD; e.g., storing circuitry comprising the model, or parameters thereof) 312. The modelling circuitry may be configured to provide the model to the determining circuitry 314.

In some embodiments, the controlling circuitry may be further configured to cause measuring of a received distortion component caused by the non-linear distortion (compare with step 220 of FIG. 2). To this end, the controlling circuitry may comprise or be otherwise associated with (e.g., connectable, or connected, to) measuring circuitry (MEAS; e.g., a measurer) 330. The measuring circuitry may be configured to cause measuring of the received distortion component caused by the non-linear distortion. For example, the measuring circuitry may be configured to measure the received distortion component caused by the non-linear distortion. The measurements may be based on an input signal 370. The determination of the distortion coefficient may be further based on the measured received distortion component.

The controlling circuitry is also configured to cause allocation of respective transmission powers for the two or more users based on the determined respective received distortion powers (compare with step 240 of FIG. 2). To this end, the controlling circuitry may comprise or be otherwise associated with (e.g., connectable, or connected, to) power allocating circuitry (PA; e.g., a power allocator) 320. The power allocating circuitry may be configured to cause the allocation of respective transmission powers for the two or more users. For example, the power allocating circuitry may be configured to allocate the respective transmission powers for the two or more users.

In some embodiments, the controlling circuitry may be configured to cause allocation of respective transmission powers by causing determination, for each of the two or more users, of a ratio between an estimated received desired signal power and an estimated received disturbance power (wherein the estimated received disturbance power comprises the respective received distortion power) and allocation of respective transmission powers based on the ratios (compare with sub-steps 242 and 246 of FIG. 2).

The controlling circuitry may be further configured to cause acquisition, for each user, of an estimated path loss and a channel quality metric (compare with step 210 of FIG. 2). To this end, the controlling circuitry may comprise or be otherwise associated with (e.g., connectable, or connected, to) acquiring circuitry (ACQ; e.g., an acquirer) 340. The acquiring circuitry may be configured to cause acquisition of the estimated path loss and the channel quality metric. For example, the acquiring circuitry may be configured to acquire the estimated path loss and the channel quality metric. The acquisition may be based on an input signal 380. The estimated received desired signal power and/or the estimated received disturbance power may be based on the estimated path loss and/or the channel quality metric.

Figure 4:
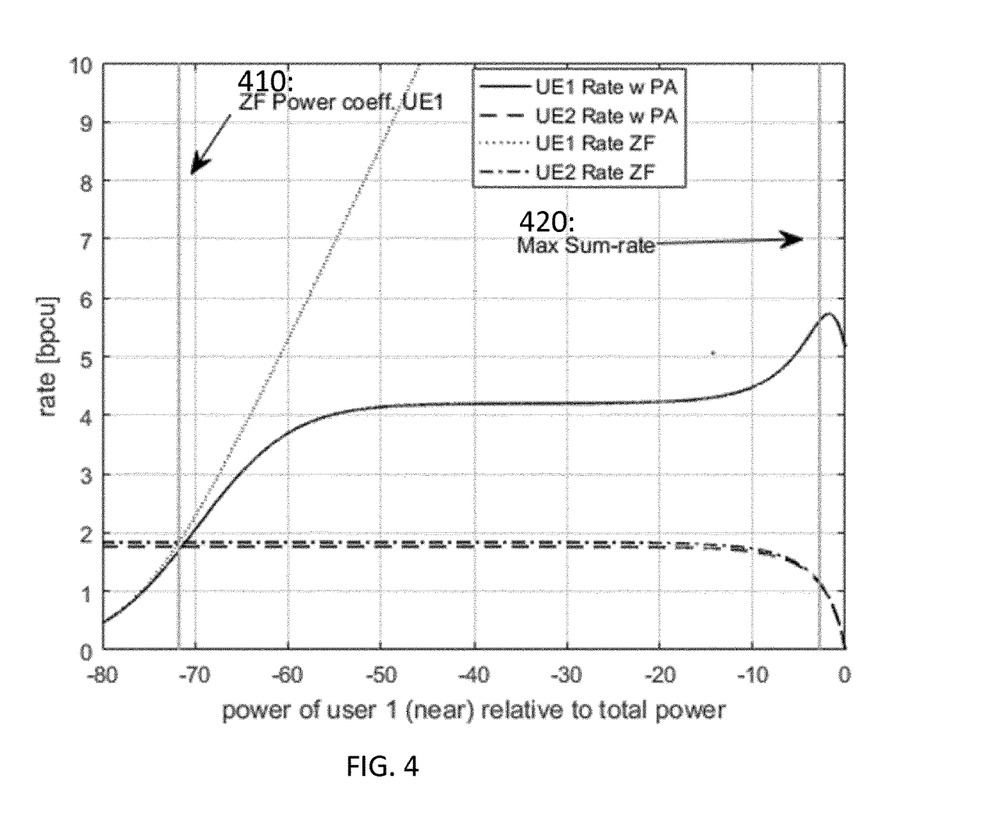
FIGS. 4 and 5 are plots illustrating example rates for varying power of a user according to some embodiments.
Figure 5:
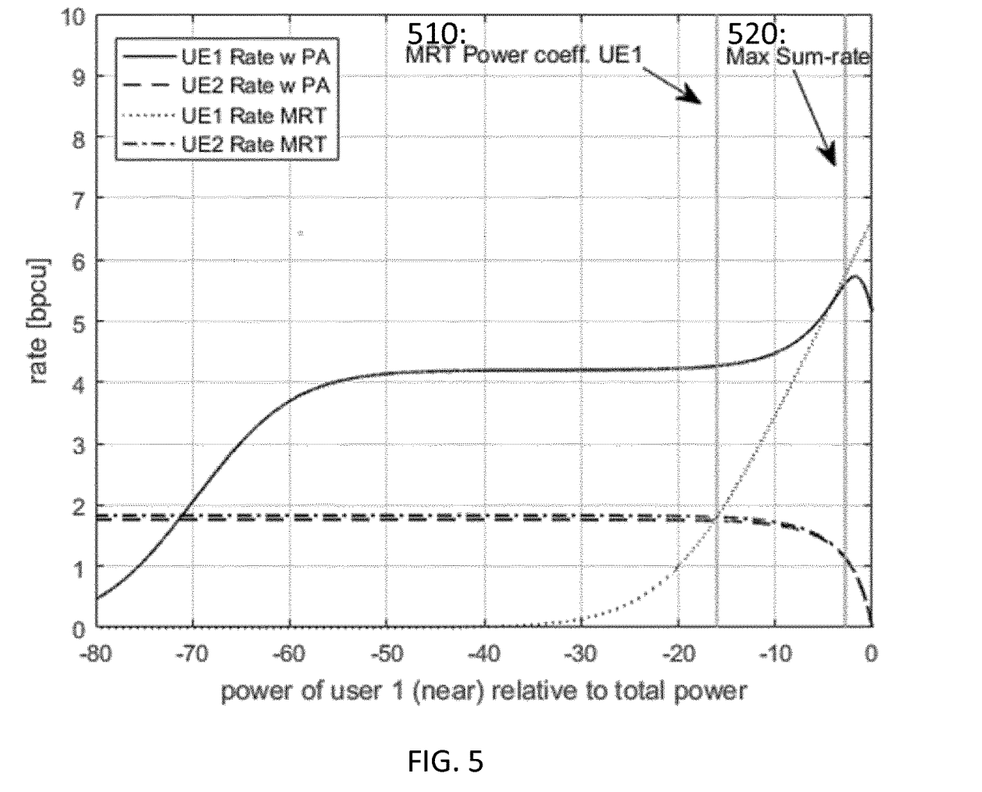

FIGS. 4 and 5 illustrate some examples of how, in a certain scenario where two users (UE1 and UE2) are served with spatial multiplexing, the rates (shown on the y-axis in bots per channel use; bpcu) of the users vary depending on how much of the total power $P_t = P_1 + P_2$ is allocated to one of the users (user 1; UE1). $P_1/P_t$ is shown on the x-axis (in dB). In the scenario used, the path loss to user 2 (UE2) is 70 dB higher than the path loss to user 1 (UE1), the noise power is −80 dB below the compression point of the power amplifiers and the average back-off is 6 dB.

FIG. 4 shows the situation when a zero-forcing (ZF) approach is applied for perfectly linear power amplifiers (dotted line for UE1 and dash-dotted line for UE2) and when a zero-forcing approach is applied for non-linear power amplifiers (solid line for UE1 and dashed line for UE2). A typical power allocation selection achieved if the non-linear distortion is not accounted for is illustrated at 410, and the power allocation selection achieved if the non-linear distortion is accounted for and a max sum-rate approach is applied is illustrated at 420. It may be seen that the selection 420 achieves a much higher rate for UE1 while the rate for UE2 is only slightly lowered compared to the selection 410.

FIG. 5 shows the situation when a maximum ratio transmission (MRT) approach is applied for perfectly linear power amplifiers (dotted line for UE1 and dash-dotted line for UE2) and when a maximum ratio transmission approach is applied for non-linear power amplifiers (solid line for UE1 and dashed line for UE2). A typical power allocation selection achieved if the non-linear distortion is not accounted for is illustrated at 510, and the power allocation selection achieved if the non-linear distortion is accounted for and a max sum-rate approach is applied is illustrated at 520. It may be seen that the selection 520 achieves a higher rate for UE1 while the rate for UE2 is only slightly lowered compared to the selection 510.

Examples of conventional power allocation methods for MRT and ZF may be found in Marzetta, Larsson, Yang and Ngo, "Fundamentals of Massive MIMO", Cambridge University Press, 2016, chapter 5.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 6:
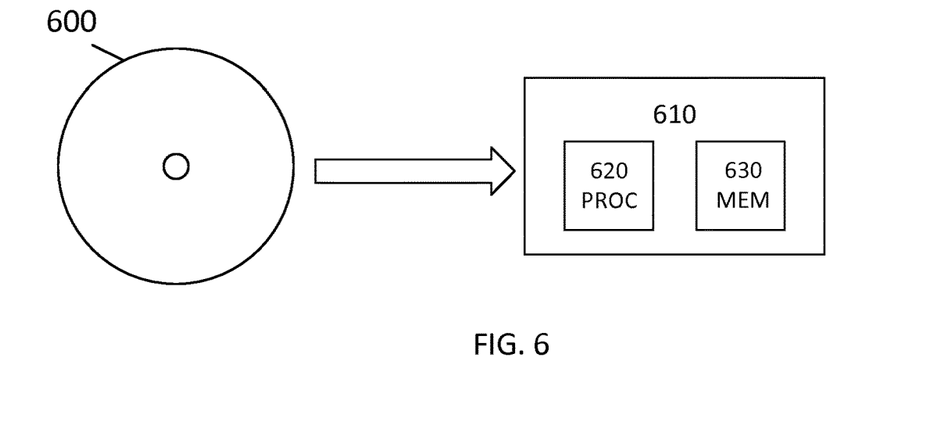
FIG. 6 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC) 620, which may, for example, be comprised in a wireless communication device or a network node 610. When loaded into the data processing unit, the computer program may be stored in a memory (MEM) 630 associated with or comprised in the data-processing unit. According to some embodiments, the computer program may, when loaded into and run by the data processing unit, cause execution of method steps according to, for example, any of the methods illustrated in FIG. 2 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A transmission power allocation method for a transmitter, the transmitter comprising a number of at least two transmitter paths for spatial multiplexing of two or more signals to be transmitted using respective allocated transmission powers to respective ones of two or more users, each transmitter path comprising at least one component causing non-linear distortion and a transmit antenna, the method comprising:
   determining a respective received distortion power for each of the two or more users, the determining being a function of respective hypothesized transmission powers for the two or more users, and the determining being based on a model of a spatial behavior of the non-linear distortion;
   the determining the respective received distortion power including:
      determining a distortion coefficient based on the model of the spatial behavior of the non-linear distortion; and
      determining the respective received distortion power based on the distortion coefficient; and
   allocating respective transmission powers for the two or more users based on the determined respective received distortion powers.

2. The method of claim 1, further comprising measuring a received distortion component caused by the non-linear distortion, and wherein determining the distortion coefficient is further based on the measured received distortion component.

3. The method of claim 1, wherein allocating respective transmission powers comprises:
   determining, for each of the two or more users, a ratio between an estimated received desired signal power and an estimated received disturbance power, wherein the estimated received disturbance power comprises the respective received distortion power; and
   allocating respective transmission powers based on the ratios.

4. The method of claim 3, further comprising acquiring, for each user, an estimated path loss and a channel quality metric, and wherein the estimated received desired signal power and/or the estimated received disturbance power is based on the estimated path loss and the channel quality metric.

5. The method of claim 3, wherein allocating respective transmission powers comprises:

mapping, for each of the two or more users, the ratio to a corresponding achievable data rate; and allocating respective transmission powers based on the achievable data rates.

6. The method of claim 5, wherein allocating respective transmission powers based on the achievable data rates comprises one of:
   allocating respective transmission powers that maximizes a minimum data rate among the users; and
   allocating respective transmission powers that maximizes a sum of data rates among the users.

7. The method of claim 1, wherein the respective received distortion power is further based on the number of transmitter paths.

8. The method of claim 1, wherein the model of the spatial behavior of the non-linear distortion is a polynomial model.

9. A transmission power allocation apparatus for a transmitter, the transmitter comprising a number of at least two transmitter paths for spatial multiplexing of two or more signals to be transmitted using respective allocated transmission powers to respective ones of two or more users, each transmitter path comprising at least one component causing non-linear distortion and a transmit antenna, the transmission power allocation apparatus comprising controlling circuitry configured to cause:
   determination of a respective received distortion power for each of the two or more users, the determination being a function of respective hypothesized transmission powers for the two or more users, and the determination being based on a model of a spatial behavior of the non-linear distortion;
   the determination of the respective received distortion power including:
      determination of a distortion coefficient based on the model of the spatial behavior of the non-linear distortion; and
      determination of the respective received distortion power based on the distortion coefficient; and
   allocation of respective transmission powers for the two or more users based on the determined respective received distortion powers.

10. The apparatus of claim 9, wherein the controlling circuitry is further configured to cause measuring of a received distortion component caused by the non-linear distortion, and wherein determination of the distortion coefficient is further based on the measured received distortion component.

11. The apparatus of claim 9, wherein the controlling circuitry is configured to cause allocation of respective transmission powers by causing:
   determination, for each of the two or more users, of a ratio between an estimated received desired signal power and an estimated received disturbance power, wherein the estimated received disturbance power comprises the respective received distortion power; and
   allocation of respective transmission powers based on the ratios.

12. The apparatus of claim 11, wherein the controlling circuitry is further configured to cause acquisition, for each user, of an estimated path loss and a channel quality metric, and wherein the estimated received desired signal power and/or the estimated received disturbance power is based on the estimated path loss and the channel quality metric.

13. The apparatus of claim 11, wherein the controlling circuitry is configured to cause allocation of respective transmission powers by causing:
   mapping, for each of the two or more users, of the ratio to a corresponding achievable data rate; and
   allocation of respective transmission powers based on the achievable data rates.

14. The apparatus of claim 13, wherein the controlling circuitry is configured to cause allocation of respective transmission powers based on the achievable data rates by causing one of:
   allocation of respective transmission powers that maximizes a minimum data rate among the users; and
   allocation of respective transmission powers that maximizes a sum of data rates among the users.

15. The apparatus of claim 9, wherein the respective received distortion power is further based on the number of transmitter paths.

16. The apparatus of claim 9, further comprising power allocating circuitry configured to allocate the respective transmission powers for the two or more users based on the determined respective received distortion powers.

17. The transmitter power allocation apparatus according to claim 11, wherein the transmitter power allocation apparatus and the least two transmitter paths are included in a transmitter.

18. A device comprising:
   a transmitter, the transmitter comprising a number of at least two transmitter paths for spatial multiplexing of two or more signals to be transmitted using respective allocated transmission powers to respective ones of two or more users, each transmitter path comprising at least one component causing non-linear distortion and a transmit antenna; and
   a transmission power allocation apparatus for the transmitter, the transmission power allocation apparatus comprising controlling circuitry configured to cause:
      determination of a respective received distortion power for each of the two or more users, the determination being a function of respective hypothesized transmission powers for the two or more users, and the determination being based on a model of a spatial behavior of the non-linear distortion;
      the determination of the respective received distortion power including:
         determination of a distortion coefficient based on the model of the spatial behavior of the non-linear distortion; and
         determination of the respective received distortion power based on the distortion coefficient; and
      allocation of respective transmission powers for the two or more users based on the determined respective received distortion powers.

* * * * *